United States Patent
Wu et al.

(10) Patent No.: US 11,019,001 B1
(45) Date of Patent: May 25, 2021

(54) SELECTIVE PRESENTATION OF GROUP MESSAGES

(71) Applicant: Snap Inc., Santa Monica, CA (US)

(72) Inventors: William Wu, Venice, CA (US); Michael Yoffa, Venice, CA (US)

(73) Assignee: Snap Inc., Santa Monica, CA (US)

( * ) Notice: Subject to any disclaimer, the term of this patent is extended or adjusted under 35 U.S.C. 154(b) by 350 days.

(21) Appl. No.: 15/437,116

(22) Filed: Feb. 20, 2017

(51) Int. Cl.
*G06F 15/16* (2006.01)
*H04L 12/58* (2006.01)
*H04L 29/08* (2006.01)

(52) U.S. Cl.
CPC .............. *H04L 51/04* (2013.01); *H04L 51/14* (2013.01); *H04L 51/16* (2013.01); *H04L 67/20* (2013.01)

(58) Field of Classification Search
CPC ......... H04L 51/04; H04L 51/14; H04L 51/16; H04L 67/20
See application file for complete search history.

(56) References Cited

U.S. PATENT DOCUMENTS

| | | |
|---|---|---|
| 5,754,939 A | 5/1998 | Herz et al. |
| 6,038,295 A | 3/2000 | Mattes |
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |

(Continued)

FOREIGN PATENT DOCUMENTS

| | | |
|---|---|---|
| CA | 2887596 A1 | 7/2015 |
| WO | 2012000107 | 1/2012 |

(Continued)

OTHER PUBLICATIONS

Castelluccia, Claude, "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

(Continued)

*Primary Examiner* — Suraj M Joshi
*Assistant Examiner* — Ayele F Woldemariam
(74) *Attorney, Agent, or Firm* — Schwegman Lundberg & Woessner, P.A.

(57) ABSTRACT

Systems and methods for soft deletion of a group chat conversation are provided. In example embodiments, a listing of suggested chat conversations are displayed in response to receiving a chat message initiation input. The listing of suggested chat conversations includes a first group chat conversation in which the user is a participant. Subsequently, it is determined that the first group chat has remained inactive for a threshold period of time, and in response a soft deletion of the first group chat is executed. The soft deletion comprises removing the first group chat from the listing of suggested chat conversations, however the first group chat remains accessible to the user in a chat feed of the user.

20 Claims, 7 Drawing Sheets

(56) References Cited

U.S. PATENT DOCUMENTS

| | | |
|---|---|---|
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,521,136 B2 * | 8/2013 | Riddle ............... H04L 51/16 |
| | | 455/412.1 |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose, et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,350,692 B1 * | 5/2016 | van As ............... H04L 51/16 |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 * | 10/2005 | Buchheit ............. G06Q 10/107 |
| | | 709/206 |
| 2005/0234850 A1 * | 10/2005 | Buchheit ............... G06Q 10/10 |
| | | 707/999.001 |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0174407 A1 * | 7/2007 | Chen ..................... G06Q 10/10 |
| | | 709/207 |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2009/0138828 A1 * | 5/2009 | Schultz ................. G06Q 10/10 |
| | | 715/853 |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0278732 A1 * | 11/2012 | Lee ....................... H04L 51/14 |
| | | 715/752 |
| 2012/0304080 A1 | 11/2012 | Wormald et al. |
| 2013/0071093 A1 | 3/2013 | Hanks et al. |
| 2013/0194301 A1 | 8/2013 | Robbins et al. |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0282096 A1 | 9/2014 | Rubinstein et al. |
| 2014/0304346 A1 * | 10/2014 | Song ..................... H04L 51/04 |
| | | 709/206 |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0227602 A1 | 8/2015 | Ramu et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0180887 A1 | 6/2016 | Sehn |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0161382 A1 | 6/2017 | Ouimet et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |

(56) References Cited

U.S. PATENT DOCUMENTS

2017/0374003 A1    12/2017   Allen et al.
2017/0374508 A1    12/2017   Davis et al.

FOREIGN PATENT DOCUMENTS

| WO | 2013008251 | 1/2013 |
| --- | --- | --- |
| WO | 2014194262 | 12/2014 |
| WO | 2015192026 | 12/2015 |
| WO | 2016054562 | 4/2016 |
| WO | 2016065131 | 4/2016 |
| WO | 2016/112299 | 7/2016 |
| WO | 2016179166 | 11/2016 |
| WO | 2016179235 | 11/2016 |
| WO | 2017176739 | 10/2017 |
| WO | 2017176992 | 10/2017 |
| WO | 2018005644 | 1/2018 |

OTHER PUBLICATIONS

Melanson, Mike, "This text message will self destruct in 60 seconds", URL: http: readwrite.com 2011 02 11 this_text_message_will_self_destruct_in_60_seconds, (Feb. 18, 2015), 4 pgs.

Sawers, Paul, "Snapchat for iOS Lets You Send Photos to Friends and Set How long They're Visible For", URL: https: thenextweb.com apps 2012 05 07 snapchat-for-ios-lets-you-send-photos-to-friends-and-set-how-long-theyre-visible-for , (May 7, 2012), 5 pgs.

Shein, Esther, "Ephemeral Data", Communications of the ACM, vol. 56, No. 9, (Sep. 2013), 20-22.

Vaas, Lisa, "StealthText, Should You Choose to Accept It", URL: http: www.eweek.com print c a MessagingandCollaboration StealthTextShouldYouChoosetoAcceptIt, (Dec. 13, 2005), 2 pgs.

Leyden, John, "This SMS will self-destruct in 40 seconds", [Online], Retrieved from the Internet: <URL: http://www.theregister.co.uk/2005/12/12/stealthtext/, (Dec. 12, 2005), 1 pg.

* cited by examiner

SELECTIVE PRESENTATION OF GROUP MESSAGES

TECHNICAL FIELD

Embodiments of the present disclosure relate generally to communication technologies and, more particularly, but not by way of limitation, to processing of group chat message conversations.

BACKGROUND

Various computing devices including mobile technologies such as smartphones provide the ability for users to send messages between devices. Group messaging applications provide a convenient way for users to keep in touch with others. In various devices, different systems may be used to manage a potentially large number of messages received by a single user.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Group messaging systems allow users to create group chat conversations including two or more participants. A group chat conversation allows the participants of the group chat conversation to send/receive messages to/from other users that are participants of the group chat conversation. As an example, a participant of a group chat conversation can draft and transmit a message as part of a group chat conversation, which will be received by the other participants of the group chat conversation.

A user can participate in multiple group chat conversations, which can be problematic. For example, presenting each group chat conversation to the user can be challenging as the number of group chat conversations increases. Accordingly, a group messaging system can provide a user with a chat feed interface listing the group chat conversations in which the user is participating. The chat feed interface can be an interface that presents a chat feed. A chat feed can be any type of listing of one or more group chat conversations, such as a listing of group chat conversations in which the user is a participant. The user can scroll through the group chat conversations listed in the chat feed, select a group chat conversation to view, read chat messages transmitted as part of the group chat conversation, as well as draft and transmit new messages as part of the group chat conversation. The group chat conversations listed in the chat feed can be labeled based on participants of the group chat conversation or, alternatively, based on a group chat conversation name assigned to the group chat conversation.

In addition to providing a user with a chat feed to manage multiple group chat conversations, the group messaging system can also provide a user with a search interface to search for group chat conversations in which the user is a participant. The search interface can enable a user to enter a search query, such as key words, names of participants, a group chat conversation name, etc. The group messaging system searches group chat conversations based on the received search queries and provides the results to the user.

To further assist a user manage multiple group chat conversations, the group messaging system can provide the user with a listing of suggested group chat conversations in which the user is participant. For example, the group messaging system can provide the user with a listing of suggested group chat conversations in response to a user selecting to create a new group chat conversation or, alternatively, in response to a user generating a new message. The user can select one of the suggested group chat conversations rather than enter participant names individually.

In some instances, group chat conversations may eventually be exhausted and/or become irrelevant. These exhausted and/or irrelevant group chat conversations may clutter a user's interface and make it difficult to find desired group chat conversations, as well as drain resources, such as memory. To alleviate these issues, the group messaging system can execute a soft deletion of group chat conversations that are assumed to be exhausted and/or irrelevant (e.g., group chat conversations that have remained inactive for a threshold period of time). Executing the soft deletion can cause the group chat conversation to be removed from the listing of suggested group chat conversations presented to the user. As a result, the suggested group chat conversations presented to a user will not include group chat conversations assumed to be exhausted and/or irrelevant.

A group chat conversation that has been soft deleted may still be accessed by a user. For example, the group chat conversation may remain in the users chat feed and a user can scroll through the chat feed to access the group chat conversation. A group chat conversation that has been soft deleted may also remain accessible via search if the group chat conversation has been assigned a group chat conversation name. Accordingly, a user can enter the group chat conversation name as a search query to access the group chat conversation.

While group chat conversations that have been assigned a group chat conversation name can remain accessible via search after a soft deletion has been executed, group chat conversations that have not been assigned a group chat conversation name may not be accessible via search. However, a user may access these types of group chat conversations via the chat feed.

Although a group chat conversation has been soft deleted, data associated with the group chat conversation is not necessarily deleted. Accordingly, the user can still access the group chat conversation, draft and transmit new messages as part of the group chat conversation, and receive messages as part of the group chat conversation. Further, if a new message is sent or received as part of a group message conversation, the soft deletion of the group chat conversation can be reversed. Hence, the group chat conversation would again appear in a listing of recommended group chat conversations and/or search results.

Figure 1:
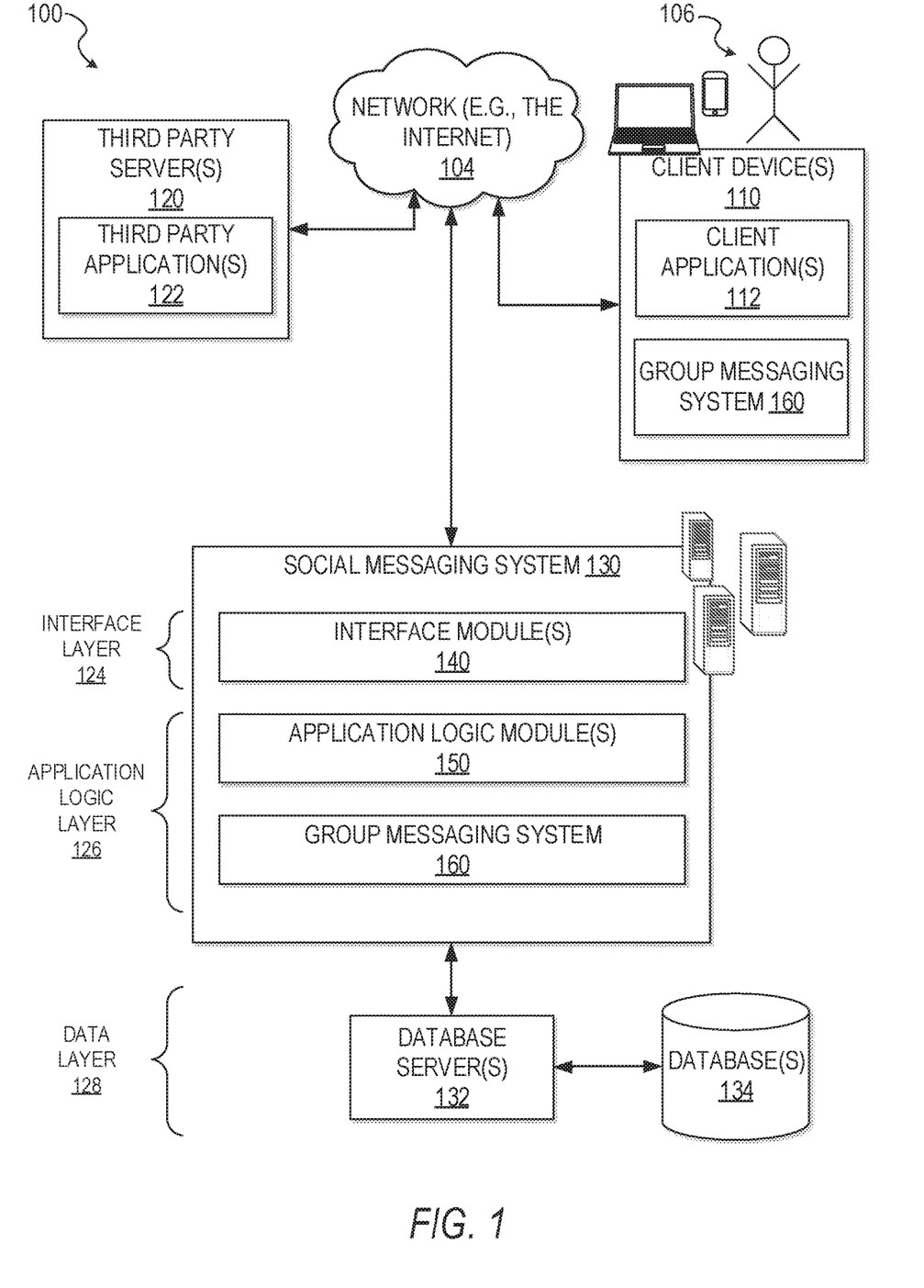
FIG. 1 is a block diagram illustrating a networked system, according to some example embodiments.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions and aspects associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such an architecture.

In some embodiments, the social messaging system 130 allows users to exchange ephemeral messages that may or may not include media content. In various embodiments described herein, any message or group chat conversation may be an ephemeral message or ephemeral conversations. An ephemeral message is any message with an associated deletion trigger. In some embodiments, for example, a text chat message may be set with a deletion trigger for a fixed amount of time after a first user views the message, or for a fixed amount of time after each user in a group chat conversation views the message. In some embodiments, a text or multimedia message may be set with a deletion trigger associated with an amount of time the content is displayed on a device. In various embodiments, these deletion triggers may be shared by all recipients, or may be individualized for different recipients. In other embodiments, a deletion trigger may be set at the beginning of a group chat conversation by a user that initiates the group chat conversation. In other embodiments, a deletion trigger may be standardized for each message, and the deletion trigger may or may not be modified by a device sending a message.

As shown in FIG. 1, the interface layer 124 consists of interface module(s) (e.g., a web server) 140, which receive requests from various client-computing devices and servers, such as client device(s) 110 executing client application(s) 112, and third party server(s) 120 executing third party application(s) 122. In response to received requests, the interface module(s) 140 communicate appropriate responses to requesting devices via a network 104. For example, the interface module(s) 140 can receive requests such as Hypertext Transfer Protocol (HTTP) requests, or other web-based Application Programming Interface (API) requests.

The client device(s) 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client device(s) 110 are executing the client application(s) 112. The client application(s) 112 can provide functionality to present information to a user 106 and communicate via the network 104 to exchange information with the social messaging system 130. Each of the client device(s) 110 can comprise a computing device that includes at least a display and communication capabilities with the network 104 to access the social messaging system 130. The client device(s) 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network personal computers (PCs), mini-computers, and the like. User(s) 106 can be a person, a machine, or other means of interacting with the client device(s) 110. In some embodiments, the user(s) 106 interact with the social messaging system 130 via the client device(s) 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), and other user data.

The databases(s) 134 further store group message data associated with group chat conversations. For example, the group message data can include a data record for each created group chat conversation. Each data record can include data associated with the corresponding group chat conversation, such as the users that are participants of the group chat conversation, a group chat conversation name assigned to the group chat conversation, messages transmitted as part of the group chat conversation, timestamps indicating when messages were sent/received, etc.

An individual can register with the social messaging system 130 to become a member of the social messaging system 130. Once registered, a member can form social network relationships (e.g., friends, followers, or contacts)

on the social messaging system 130 and interact with a broad range of applications provided by the social messaging system 130.

The application logic layer 126 includes various application logic module(s) 150, which, in conjunction with the interface module(s) 140, generate various user interfaces with data retrieved from various data sources or data services in the data layer 128. Individual application logic module(s) 150 may be used to implement the functionality associated with various applications, services, and features of the social messaging system 130. For instance, a social messaging application can be implemented with one or more of the application logic module(s) 150. The social messaging application provides a messaging mechanism for users of the client device(s) 110 to send and receive messages that include text and media content such as pictures and video. The client device(s) 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application server module(s) 150.

As illustrated in FIG. 1, the social messaging system 130 includes a group messaging system 160. In various embodiments, the group messaging system 160 can be implemented as a standalone system and is not necessarily included in the social messaging system 130. In some embodiments, the client device(s) 110 include a portion of the group messaging system 160 (e.g., a portion of the group messaging system 160 included independently or in the client application(s) 112). In embodiments where the client device(s) 110 includes a portion of the group messaging system 160, the client device(s) 110 can work alone or in conjunction with the portion of the group messaging system 160 included in a particular application server or included in the social messaging system 130.

The group messaging system 160 provides functionality enabling users to participate in and manage multiple group chat conversations. A group chat conversation, as referred to herein, is any set of communications, messages, etc., between two or more user participants. A group chat conversation can be stored in a memory of a client device 110, or stored within one or more databases 134. A group chat conversation includes one or more messages, with later messages initiated in response to one or more earlier messages or otherwise associated with earlier messages. Messages within a group chat conversation may comprise text, image files, hyperlinks, audio files, video files, and other media. A group chat conversation as referred to herein is a conversation involving two or more user participants, user accounts, or devices that send or receive any messages of a set of messages in a communication. A group chat conversation may also be considered as any conversation where one or more messages that make up a conversation are sent to one or more recipients.

Figure 2:
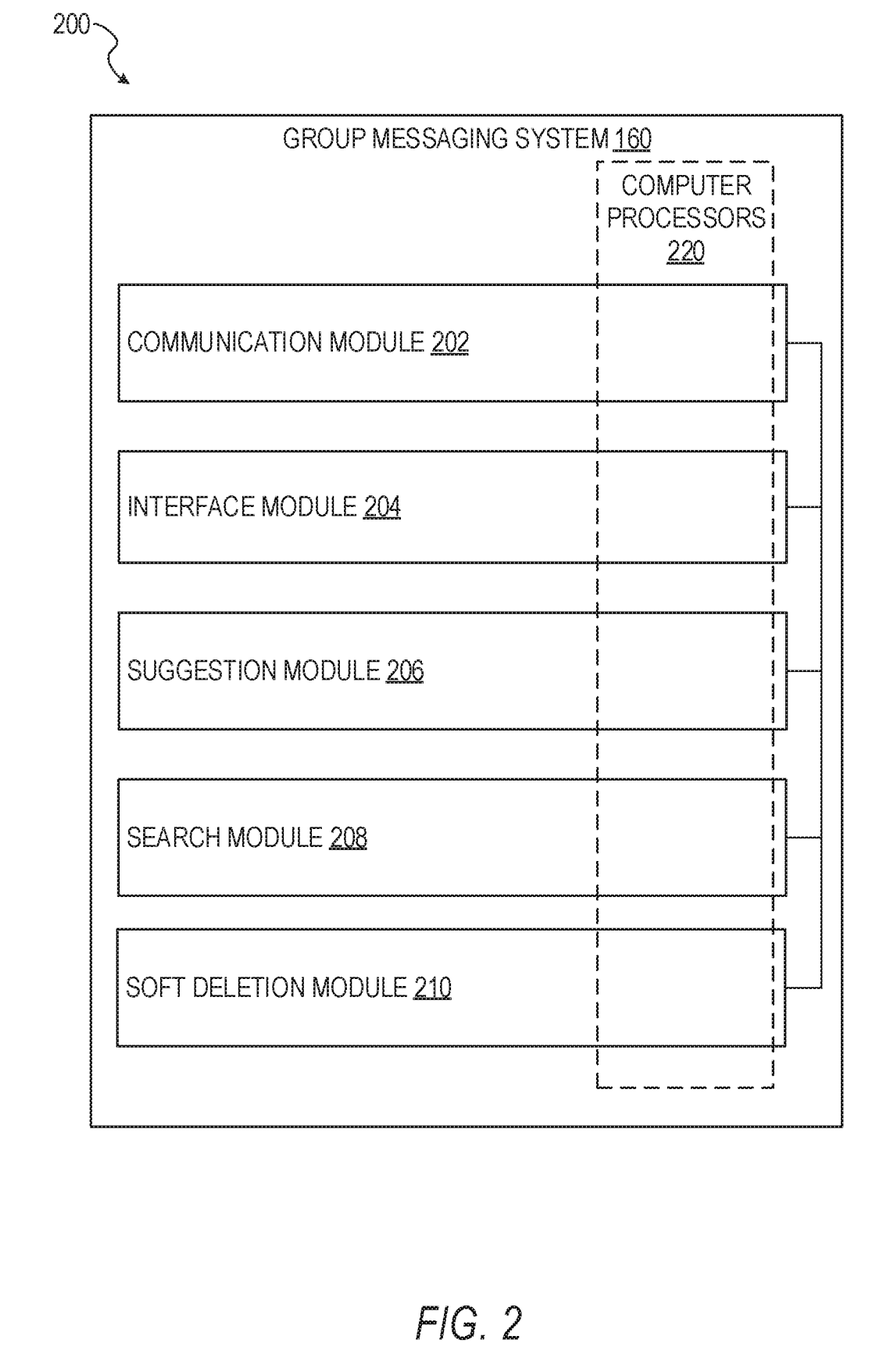
FIG. 2 is a block diagram of the group messaging system, according to certain example embodiments.

FIG. 2 is a block diagram 200 of the group messaging system 160, according to certain example embodiments. The group messaging system 160 is shown as including a communication module 202, an interface module 204, a suggestion module 206, a search module 208 and a soft deletion module 210. The various modules of the group messaging system 160 are configured to communicate with each other (e.g., via a bus, shared memory, or a switch). Any one or more of these modules may be implemented using one or more computer processors 220 (e.g., by configuring such one or more computer processors to perform functions described for that module) and hence may include one or more of the computer processors 220.

Figure 7:
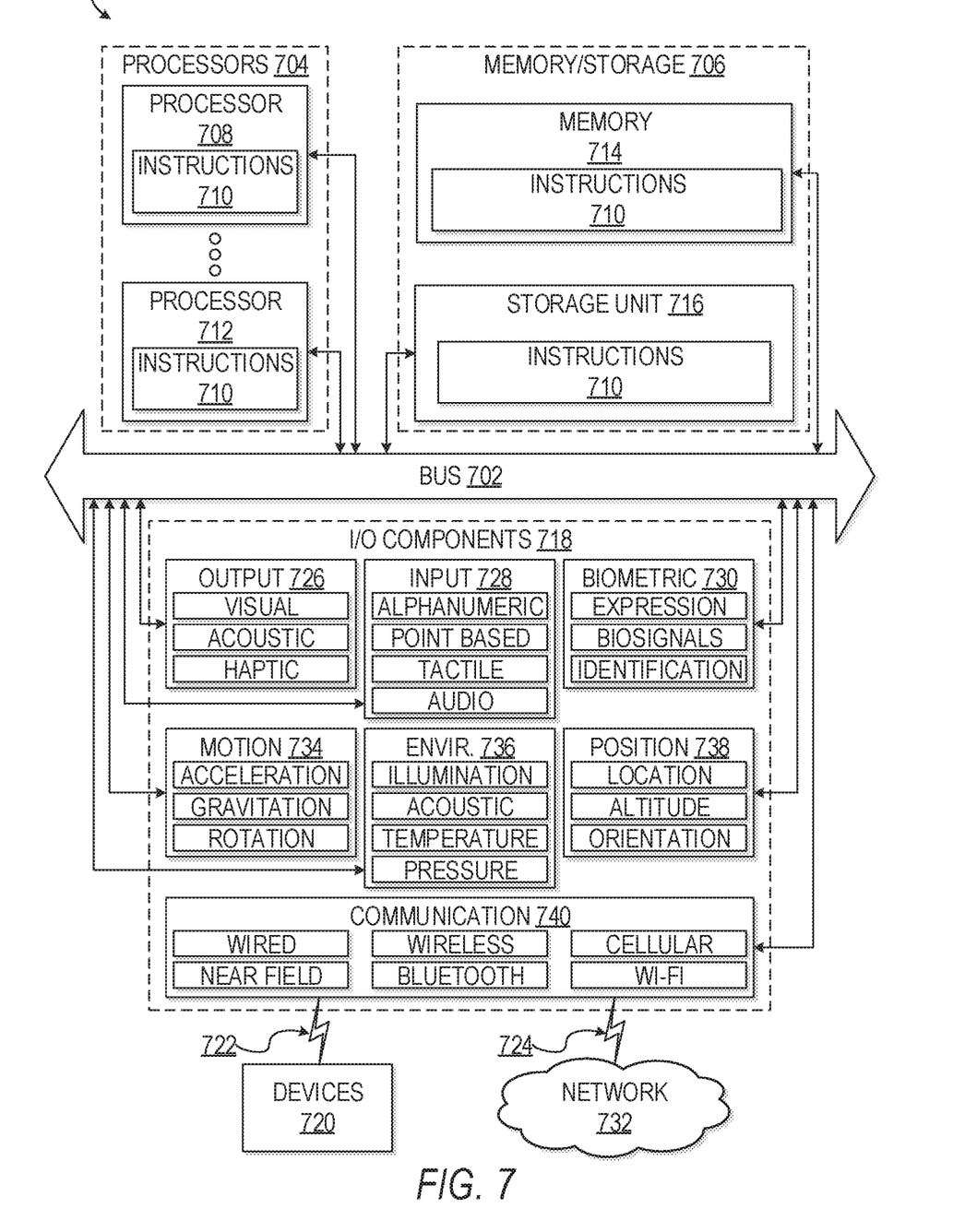
FIG. 7 is a block diagram illustrating components of a machine, according to some example embodiments, able to read instructions from a machine-readable medium (e.g., a machine-readable storage medium) and perform any one or more of the methodologies discussed herein.

Any one or more of the modules described may be implemented using hardware alone (e.g., one or more of the computer processors 704 of a machine (e.g., machine 700)) or a combination of hardware and software. For example, any described module of the group messaging system 160 may physically include an arrangement of one or more of the computer processors 704 (e.g., a subset of or among the one or more computer processors of the machine (e.g., machine 700)) configured to perform the operations described herein for that module. As another example, any module of the group messaging system 160 may include software, hardware, or both, that configure an arrangement of one or more computer processors 704 (e.g., among the one or more computer processors of the machine (e.g., machine 700)) to perform the operations described herein for that module. Accordingly, different modules of the group messaging system 160 may include and configure different arrangements of such computer processors 704 or a single arrangement of such computer processors 704 at different points in time. Moreover, any two or more modules of the group messaging system 160 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 202 provides various communication functionality. For example, the communication module 202 receives and transmits a plurality of messages as part of group chat conversations accessible by one or more client devices 110. In a specific example, the communication module 202 receives and transmits a variety of message content, including text messages, images, embedded links, and the like. The communication module 202 exchanges network communications with the database server(s) 132, the client device(s) 110, and the third party server(s) 120. The information retrieved by the communication module 202 includes data associated with the user (e.g., member profile data from an online account or social network service data) or other data to facilitate the functionality described herein.

The interface module 204 provides user interface functionality for group chat conversations. As one example, the interface module 202 provides users with a group chat interface in which users can transmit and receive messages as part of a group chat conversation. The group chat interface can further enable users to create new group chat conversations. For example, the group chat interface can enable a user to select one or more participants to include in the group chat conversation, assign a group chat interface name, and/or transmit a message to the selected participants as part of the group chat conversation.

As another example, the interface module 202 provides users with a chat feed interface that lists group chat conversations in which the user is a participant. The user can select one of the listed group chat conversations to cause presentation of a corresponding group chat interface, which the user can use to review messages transmitted as part of the group chat conversation, as well as draft and transmit new messages. In some embodiments, the group chat conversations listed in the chat feed can be labeled based on participants of the group chat conversation or, alternatively, based on a group chat conversation name assigned to the group chat conversation.

To present a chat feed interface to a user, the interface module 204 can access group messaging data associated with the user. For example, the interface module 204 can access group messaging data from the database(s) 134 that are associated with the user and/or the client device. Additionally, the interface module 204 can access group messaging data stored locally by the client device 110. The group messaging data can include data records for group chat conversations in which the user is a participant. Each data record can include metadata associated with the group chat conversations, such as group chat conversation names, user participants, timestamps, messages, etc.

In some embodiments, the group chat conversations can be listed in the chat feed based on a length of time that each group chat conversation has remained inactive (e.g., an amount of elapsed time since a message has been transmitted as part of the group chat conversation). For example, the group chats conversations that have remained inactive for the shortest amount of time (e.g., the most recently active group chat conversations) can be listed higher in the chat feed, whereas group chat conversations that have remained inactive longest can be listed lower in the chat feed. Accordingly, the user will be presented with the most recently active group chat conversations first in the chat feed, and be able to scroll down in the chat feed to access group chat conversations that have remained inactive for a longer period of time.

The interface module 204 determines the length of time that each group chat conversation has remained inactive based on the timestamp data associated with the messages transmitted as part of the group chat conversations. For example, the interface module 204 can access the timestamp value for the most recent message transmitted as part of the group chat conversation. The interface module 204 can then order the group chat conversations in the chat feed based on the timestamp value for the most recent message transmitted as part of the group chat conversation.

The suggestion module 206 provides a user with a listing of suggested group chat conversations. For example, the suggestion module 206 can provide the user with a listing of suggested group chat conversations in response to receiving a message initiation input. A message initiation input can be a user input to create and/or send a message as part of a group chat conversation. For example, a message initiation input can be received as a result of a user selecting to create a new group chat conversation or, alternatively, in response to a user generating a new message. The user can use the listing of suggested group chat conversations to select an existing group chat conversation rather than entering participant names individually.

The suggestion module 206 can gather group messaging data associated with a user and/or the client device 110 to provide the user with the suggested group chat conversations. For example, the suggestion module 206 can gather the group messaging data from the database(s) 134 and/or from data stored locally by the client device 110.

The search module 208 enables a user to search the group chat conversations in which the user is a participant. For example, the search module 208 provides the user with a search interface that the user can utilize to enter a search query, such as a group chat conversation name, keyword, user participants, etc. The search module 208 can utilize an entered search query to search group messaging data associated with the user and/or the client device 110. For example, the search module 208 can search the group messaging data stored by the database(s) 134 and/or stored locally by the client device 110. The search module 208 can provide the resulting search results to the user. For example, the search module 208 can provide the search results within the search interface. A user can utilize the search results to access a corresponding group chat conversation.

The soft deletion module 210 can execute a soft deletion of a group chat conversation that has remained inactive for a threshold period of time. The soft deletion module 210 can gather the timestamp value for the most recent message transmitted as part of a group chat conversation to determine whether the group chat conversation has remained inactive for the threshold period of time.

Soft deleting a group chat conversation causes the group chat conversation to be removed from the listing of suggested group chat conversations presented to the user. A group chat conversation that has been soft deleted may still be accessed by a user. For example, the group chat conversation may remain in the users chat feed, thereby allowing the user to scroll through the chat feed to access the group chat conversation.

A group chat conversation that has been soft deleted may also remain accessible via search if the group chat conversation has been assigned a group chat conversation name. Accordingly, a user can enter the group chat conversation name as a search query to access the group chat conversation. While group chat conversations that have been assigned a group chat conversation name can remain accessible via search after a soft deletion has been executed, group chat conversations that have not been assigned a group chat conversation name may not be accessible via search. A user may, however, access these types of group chat conversations via the chat feed.

To soft delete a group chat conversation, the soft deletion module 210 can modify group messaging data associated with the group chat conversation indicating that the group chat conversation has been soft deleted. For example, the soft deletion module 210 can flag, mark or otherwise modify the data record for a group chat conversation to indicate that the group chat conversation has been soft deleted. The suggestion module 206 and/or the search module 208 can detect the modification to the data record and determine that the corresponding group chat conversation has been soft deleted and therefore should not be included in the listing of suggested group chat conversations and/or search results.

In some embodiments, the soft deletion module 210 can modify the data record to indicate that the group chat conversation should not be included in the listing of suggested group chat conversations and search results. Alternatively, the soft deletion module 210 can modify the data record to indicate that the group chat conversation should not be included in the listing of suggested group chat conversations, but should remain included in search results. For example, the soft deletion module 210 can determine whether the group chat conversation has been assigned a group chat conversation name and modify the data record according to whether the group chat conversation has been assigned a group chat conversation name.

It should be noted that although a group chat conversation has been soft deleted, the group messaging data (e.g., data record) associated with the group chat conversation is not deleted. Accordingly, the user can still access the group chat conversation, draft and transmit new messages as part of the group chat conversation and receive messages as part of the group chat conversation. If a new message is sent or received as part of a group message conversation, the group messaging data associated with the group chat conversation can be modified back to indicate that the group chat conversation is no longer soft deleted. For example, the data record associated with the group chat conversation can be modified to remove any flag or mark indicating that the group chat conversation has been soft deleted. Hence, the group chat conversation would again appear in a listing of recommended group chat conversations and/or search results.

Figure 3:
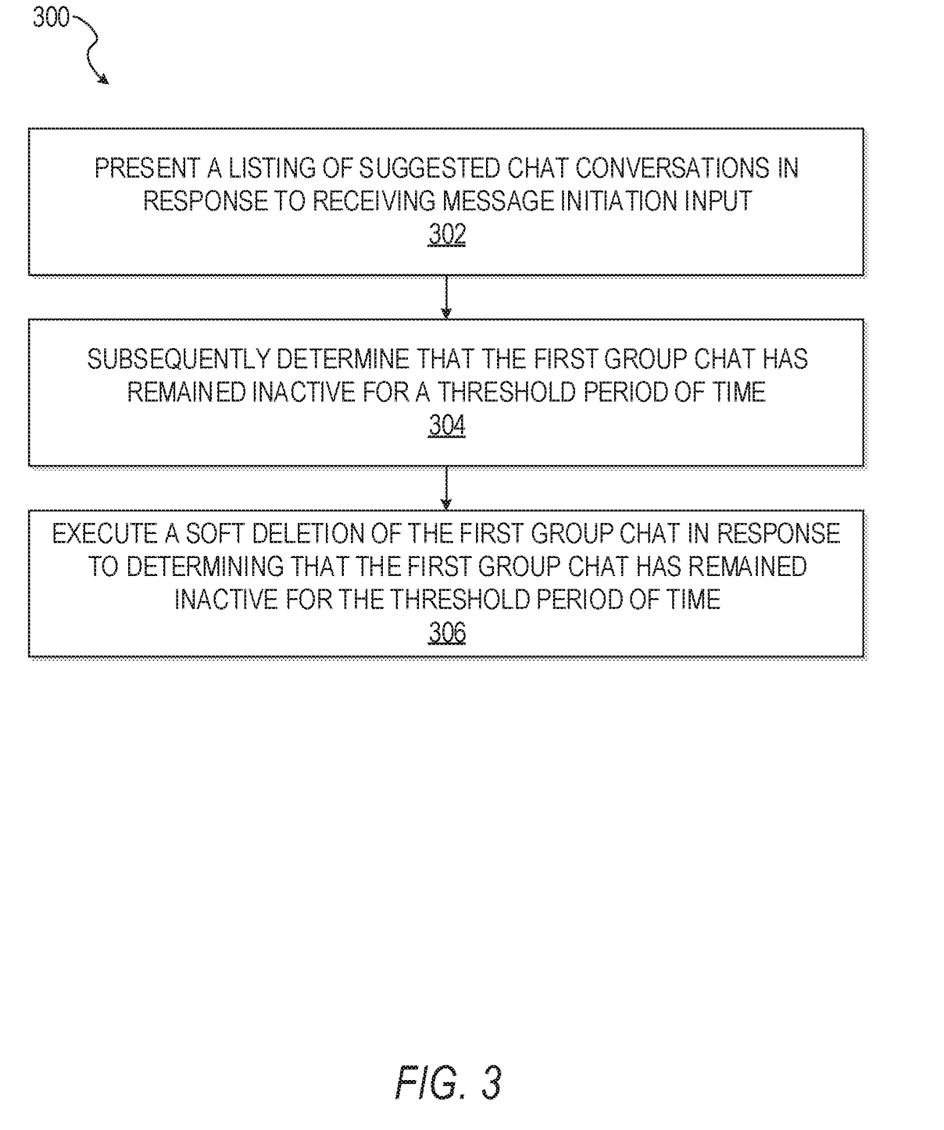
FIG. 3 is a flow chart showing an example method for the soft deletion of group chat conversations, according to some example embodiments.

FIG. 3 is a flowchart showing an example method for the soft deletion of group chat conversations, according to some example embodiments. The method 300 may be embodied in computer readable instructions for execution by one or more processors such that the operations of the method 300 may be performed in part or in whole by the group messaging system 160; accordingly, the method 300 is described below by way of example with reference thereto. However, it shall be appreciated that at least some of the operations of the method 300 may be deployed on various other hardware configurations and the method 300 is not intended to be limited to the group messaging system 160.

At operation 302, the suggestion module 206 presents a listing of suggested chat conversations in response to receiving message initiation input. The listing of suggested chat conversations includes at least a first group chat conversation in which the user is a participant. In some embodiments, the message initiation input is caused by the user selecting to create a new chat conversation. Alternatively, in some embodiments the message initiation input is caused by the user drafting a new message.

To present the listing of suggested chat conversations, the suggestion module 206 can access group messaging data associated with the user and/or the client device. The group messaging data can include data records for group chat conversations in which the user is a participant. The suggestion module 206 can utilize the group messaging data to provide the user with the listing of suggested chat conversations. The listing of suggested chat conversations can include each chat conversation in which the user is a participant or, alternatively, a subset of the chat conversations. For example, the listing of suggested chat conversations can include chat conversations that the user participates in most frequently, the chat conversations that includes the most messages, etc.

At operation 304, the soft deletion module 210 subsequently determines that the first group chat conversation has remained inactive for a threshold period of time. The soft deletion module 210 can gather a most recent timestamp value associated with the first group chat conversation to determine a period of time that the first group chat conversation has remained inactive. The soft deletion module 210 can then compare the period of time that the first group chat conversation has remained inactive to the threshold period of time.

At operation 306, the soft deletion module 210 executes a soft deletion of the first group chat in response to determining that the first group chat has remained inactive for the threshold period of time. The soft deletion can include removing the first group chat conversation from the listing of suggested chat conversations. Accordingly, once the first group chat conversation has been soft deleted, it will not be presented as a suggested group chat conversation to the user.

The first group chat will remain accessible to the user in a chat feed of the user. The chat feed of the user includes a listing of chat conversations in which the user is a participant. For example the listing of chat conversations can be ordered in the chat feed based on time stamp values associated with each chat conversation in the listing of chat conversations. The user can use the chat feed to access the first group chat conversation after the first group conversation has been deleted.

Figure 4:
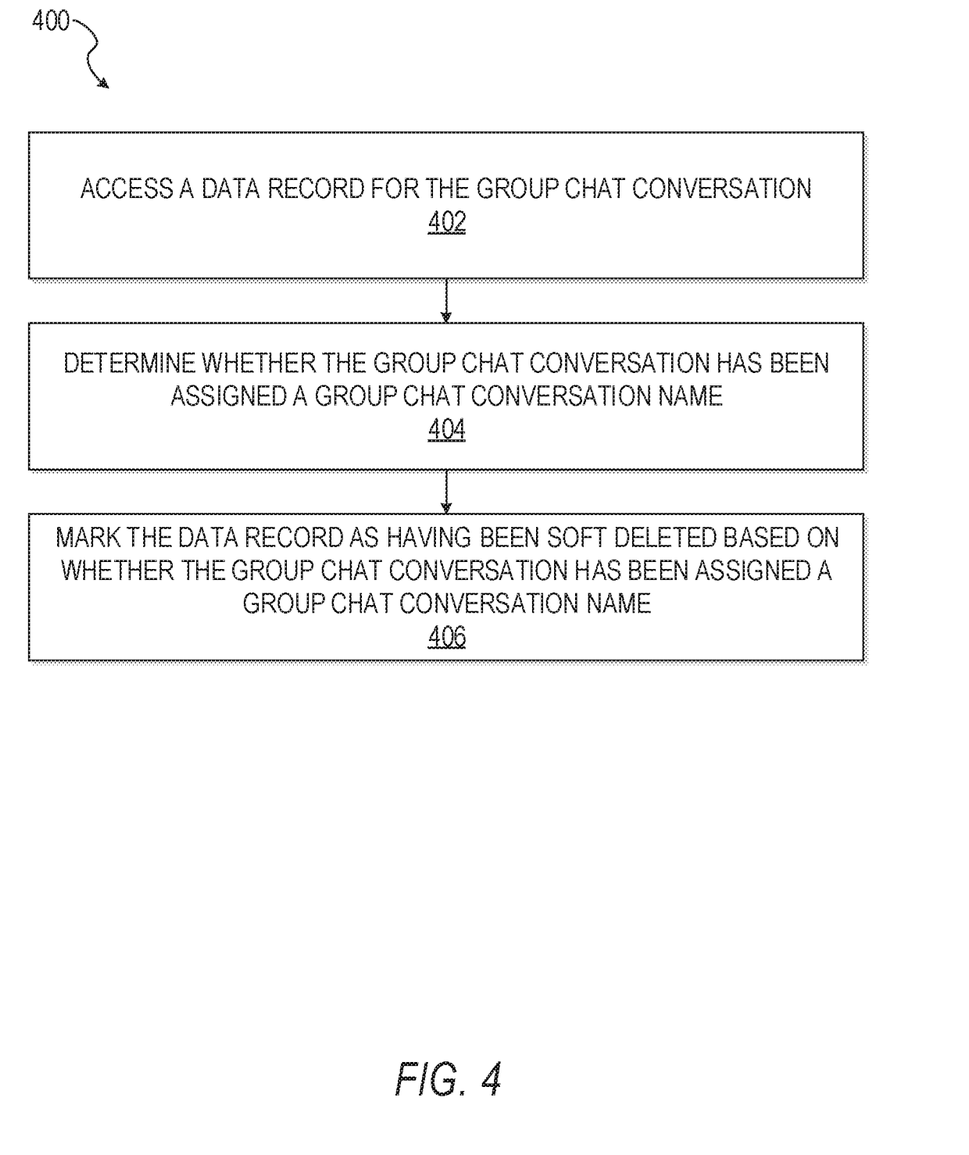
FIG. 4 is a flow chart showing an example method for executing the soft deletion of a group chat conversation, according to some example embodiments.

FIG. 4 is a flowchart showing an example method for executing the soft deletion of a group chat conversation, according to some example embodiments. The method 400 may be embodied in computer readable instructions for execution by one or more processors such that the operations of the method 400 may be performed in part or in whole by the group messaging system 160 accordingly, the method 400 is described below by way of example with reference thereto. However, it shall be appreciated that at least some of the operations of the method 400 may be deployed on various other hardware configurations and the method 400 is not intended to be limited to the group messaging system 160.

At operation 402, the soft deletion module 210 accesses a data record for the group chat conversation. The soft deletion module 210 can access the data record from the databases 134 or from data stored by the client device 110. The data record can include data associated with the group chat conversations, such as timestamp data, messages, assigned group chat conversation name, group participants, etc.

At operation 404, the soft deletion module 210 determines whether the group chat conversation has been assigned a group chat conversation name. For example, the soft deletion module 210 can determine whether the group chat conversation has been assigned a group chat conversation names based on the data record for the group chat conversation.

At operation 406, the soft deletion module 210 marks the data record as having been soft deleted based on whether the group chat conversation has been assigned a group chat conversation name. For example, if the group chat conversation has not been assigned a group chat conversation name, the soft deletion module 210 can mark the data record to indicate that the group chat conversation has been soft deleted and should not be included in a listing of suggested group chat conversations or search results. Alternatively, if the group chat conversation has been assigned a group chat conversation name, the soft deletion module 210 can mark the data record to indicate that the group chat conversation has been soft deleted and should not be included in a listing of suggested group chat conversations, however should remain in search results.

Figure 5:
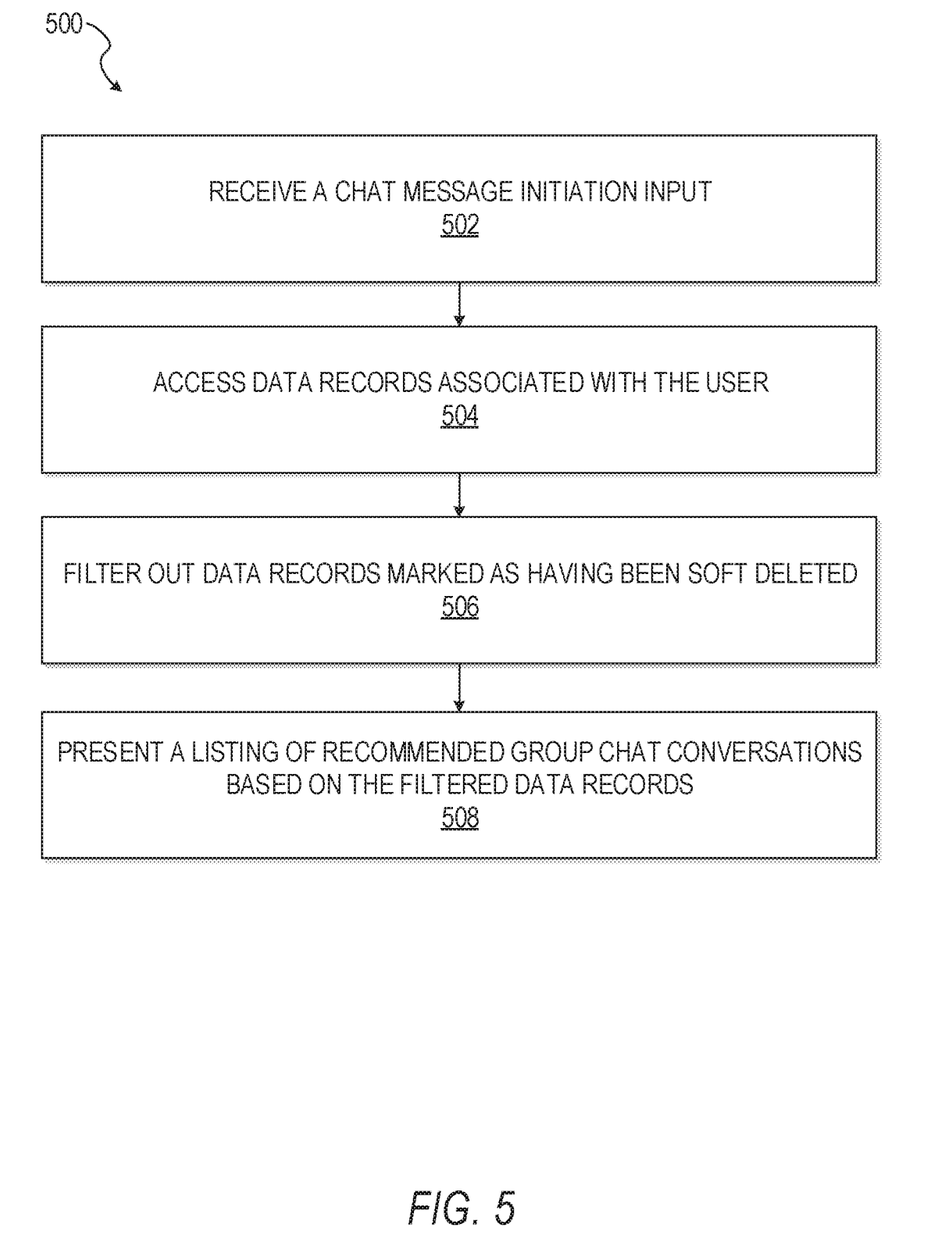
FIG. 5 is a flow chart showing an example method for presenting a listing of suggested group chat conversations, according to some example embodiments.

FIG. 5 is a flowchart showing an example method for presenting a listing of suggested group chat conversations, according to some example embodiments. The method 500 may be embodied in computer readable instructions for execution by one or more processors such that the operations of the method 500 may be performed in part or in whole by the group messaging system 160 accordingly, the method 500 is described below by way of example with reference thereto. However, it shall be appreciated that at least some of the operations of the method 500 may be deployed on various other hardware configurations and the method 500 is not intended to be limited to the group messaging system 160.

At operation 502, the suggestion module 206 receives a message initiation input. In some embodiments, the message initiation input is caused by the user selecting to create a new chat conversation. Alternatively, in some embodiments the message initiation input is caused by the user drafting a new message.

At operation 504, the suggestion module 206 accesses data records associated with the user. The suggestion module 206 can access the data records from the databases 134 or from data stored by the client device 110. The data records can include data associated with group chat conversations in which the user is a participant, such as timestamp data, messages, assigned group chat conversation names, group participants, etc.

At operation 506, the suggestion module 206 filters out data records marked as having been soft deleted.

At operation 508, the suggestion module 206 presents a listing of recommended group chat conversations based on the filtered data records. Accordingly, the listing of recommended group chat conversations will not include group chat conversations that have been soft deleted.

Software Architecture

Figure 6:
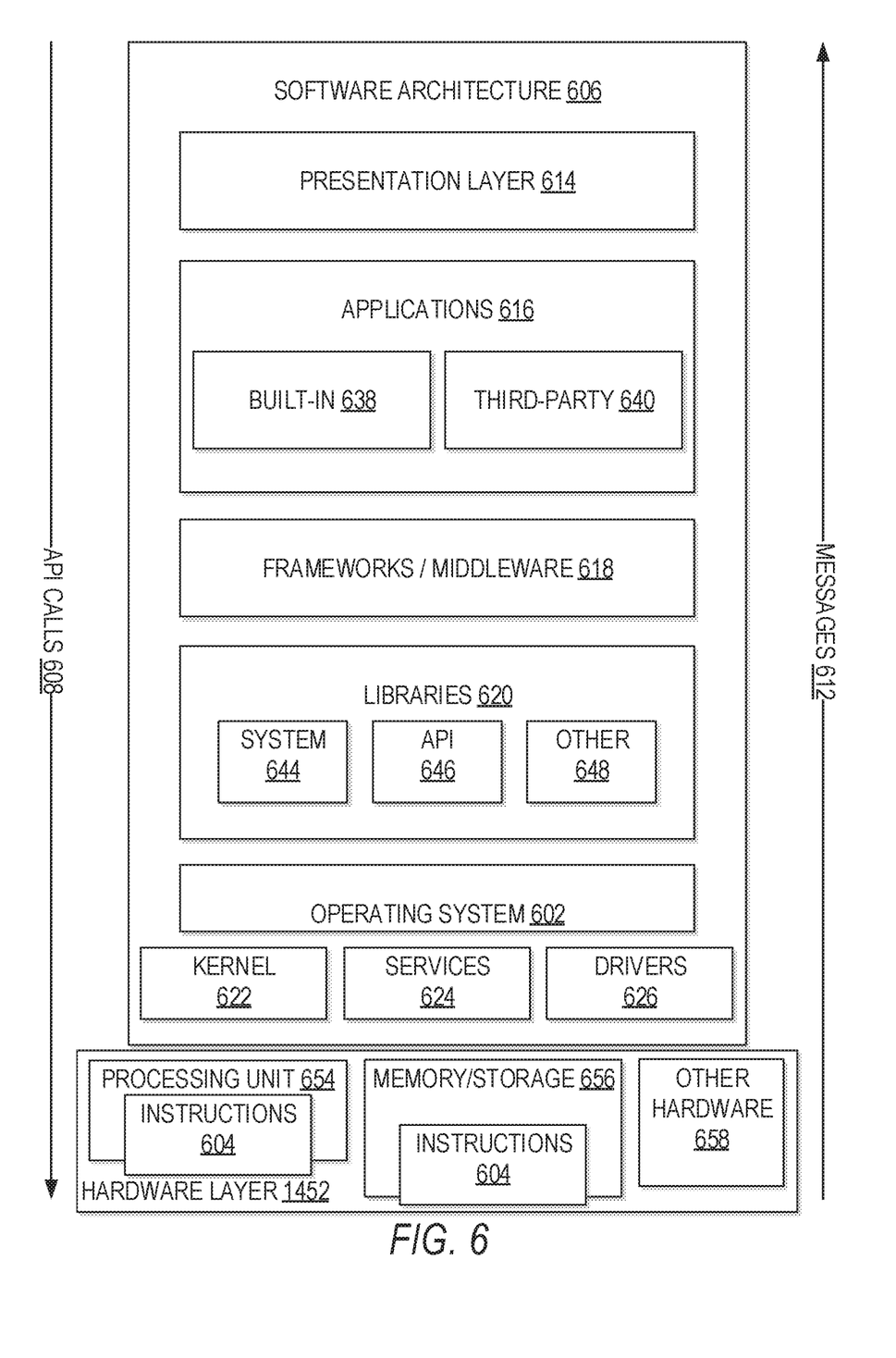
FIG. 6 is a block diagram illustrating an example software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory and/or storage modules memory/storage 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 and/or other components within the layers may invoke application programming interface (API) API calls 608 through the software stack and receive a response as in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers. Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental environment components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components

740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

What is claimed is:

1. A method comprising:
    in response to receiving a first chat message initiation input from a client device of a user, presenting, on a display of the client device, a plurality of suggested chat conversations, the plurality of suggested chat conversations including a first group chat conversation in which the user is a participant;
    generating a deletion trigger, the deletion trigger being based on a fixed amount of time after the first group chat conversation is presented on the display;
    determining that the first group chat conversation has remained inactive for a threshold period of time;
    in response to determining that the first group chat conversation has remained inactive for the threshold period of time, executing a soft deletion of the first group chat conversation by storing data indicating that the first group chat conversation has been soft deleted, removing the first group chat conversation from the plurality of suggested chat conversations, and keeping the first group chat conversation accessible to the user in a chat feed of the user;
    detecting a new message being exchanged in the first group chat conversation;
    associating the deletion trigger with the new message and the first group chat conversation that has been soft deleted; and
    in response to detecting that the new message exchanged is associated with the deletion trigger and the first group chat conversation that has been soft deleted:
        modifying the stored data to indicate that the first group chat conversation is no longer soft deleted;
        adding the first group chat conversation back to the plurality of suggested chat conversations;
    determining that the first group chat conversation has been assigned a group chat conversation name;
    receiving, via a search interface, a user input comprising one or more words that form a search query that returns a list of conversation search results that match the one or more words of the user input;
    adding the first group chat conversation to the list of search results in response to determining that the first group chat conversation has been assigned the group chat conversation name; and
    excluding the first group chat conversation from the list of search results in response to determining that the first group chat conversation has not been assigned the group chat conversation name.

2. The method of claim 1, further comprising:
    after executing the soft deletion of the first group chat conversation, receiving a second chat message initiation input from the client device; and
    in response to receiving the second chat message initiation input, presenting, on the display of the client device, the plurality of suggested chat conversations in which the first group chat conversation is not included.

3. The method of claim 2, further comprising selectively enabling access to the first group chat conversation that has been soft deleted through a conversation search based on the second group chat conversation being assigned a group chat conversation name.

4. The method of claim 1, wherein the chat feed of the user includes chat conversations in which the user is a participant, the chat conversations ordered in the chat feed based on time stamp values associated with each chat conversation.

5. The method of claim 1, further comprising selectively enabling access to the first group chat conversation that has been soft deleted through a conversation search based on the first group chat conversation being assigned a group chat conversation name.

6. The method of claim 1, further comprising:
    after executing the soft deletion of the first group chat conversation, receiving a search query including a group chat conversation name of the first group chat conversation;
    accessing the first group chat conversation name based on the search query; and
    presenting the first group chat conversation on a display of the client device in response to the search query.

7. The method of claim 1, wherein the first group chat conversation does not have a group chat conversation name and the first group chat conversation becomes inaccessible via a search query after executing the soft deletion of the first group chat conversation.

8. A client device comprising:
    one or more computer processors; and
    one or more computer-readable mediums storing instructions that, when executed by the one or more computer processors, cause the client device to perform operations comprising:
        in response to receiving a first chat message initiation input from a client device of a user, presenting, on a display of the client device, a plurality of suggested chat conversations, the plurality of suggested chat conversations including a first group chat conversation in which the user is a participant;
        generating a deletion trigger, the deletion trigger being based on a fixed amount of time after the first group chat conversation is presented on the display;
        determining that the first group chat conversation has remained inactive for a threshold period of time;
        in response to determining that the first group chat conversation has remained inactive for the threshold period of time, executing a soft deletion of the first group chat conversation by storing data indicating that the first group chat conversation has been soft deleted, removing the first group chat conversation from the plurality of suggested chat conversations, and keeping the first group chat conversation accessible to the user in a chat feed of the user;
        detecting a new message being exchanged in the first group chat conversation;
        associating the deletion trigger with the new message and the first group chat conversation that has been soft deleted; and
        in response to detecting that the new message exchanged is associated with the deletion trigger and the first group chat conversation that has been soft deleted:

modifying the stored data to indicate that the first group chat conversation is no longer soft deleted;
adding the first group chat conversation back to the plurality of suggested chat conversations;
determining that the first group chat conversation has been assigned a group chat conversation name;
receiving, via a search interface, a user input comprising one or more words that form a search query that returns a list of conversation search results that match the one or more words of the user input;
adding the first group chat conversation to the list of search results in response to determining that the first group chat conversation has been assigned the group chat conversation name; and
excluding the first group chat conversation from the list of search results in response to determining that the first group chat conversation has not been assigned the group chat conversation name.

9. The client device of claim 8, the operations further comprising:
after executing the soft deletion of the first group chat conversation, receiving a second chat message initiation input from the client device; and
in response to receiving the second chat message initiation input, presenting, on the display of the client device, the plurality of suggested chat conversations in which the first group chat conversation is not included.

10. The client device of claim 9, the operations further comprising selectively enabling access to the second group chat conversation that has been soft deleted through a conversation search based on the second group chat conversation being assigned a group chat conversation name.

11. The client device of claim 8, wherein the chat feed of the user includes chat conversations in which the user is a participant, the chat conversations ordered in the chat feed based on time stamp values associated with each chat conversation.

12. The client device of claim 8, the operations further comprising selectively enabling access to the first group chat conversation that has been soft deleted through a conversation search based on the first group chat conversation being assigned a group chat conversation name.

13. The client device of claim 8, the operations further comprising:
after executing the soft deletion of the first group chat conversation, receiving a search query including a group chat conversation name of the first group chat conversation;
accessing the first group chat conversation name based on the search query; and
presenting the first group chat conversation on a display of the client device in response to the search query.

14. The client device of claim 8, wherein the first group chat conversation does not have a group chat conversation name and the first group chat conversation becomes inaccessible via a search query after executing the soft deletion of the first group chat conversation.

15. A non-transitory computer-readable medium storing instructions that, when executed by one or more computer processors of a client device, cause the client device to perform operations comprising:
in response to receiving a first chat message initiation input from a client device of a user, presenting, on a display of the client device, a plurality of suggested chat conversations, the plurality of suggested chat conversations including a first group chat conversation in which the user is a participant;
generating a deletion trigger, the deletion trigger being based on a fixed amount of time after the first group chat conversation is presented on the display;
determining that the first group chat conversation has remained inactive for a threshold period of time;
in response to determining that the first group chat conversation has remained inactive for the threshold period of time, executing a soft deletion of the first group chat conversation by storing data indicating that the first group chat conversation has been soft deleted, removing the first group chat conversation from the plurality of suggested chat conversations, and keeping the first group chat conversation accessible to the user in a chat feed of the user;
detecting a new message being exchanged in the first group chat conversation;
associating the deletion trigger with the new message and the first group chat conversation that has been soft deleted; and
in response to detecting that the new message exchanged is associated with the deletion trigger and the first group chat conversation that has been soft deleted:
modifying the stored data to indicate that the first group chat conversation is no longer soft deleted;
adding the first group chat conversation back to the plurality of suggested chat conversations;
determining that the first group chat conversation has been assigned a group chat conversation name;
receiving, via a search interface, a user input comprising one or more words that form a search query that returns a list of conversation search results that match the one or more words of the user input;
adding the first group chat conversation to the list of search results in response to determining that the first group chat conversation has been assigned the group chat conversation name; and
excluding the first group chat conversation from the list of search results in response to determining that the first group chat conversation has not been assigned the group chat conversation name.

16. The non-transitory computer-readable medium of claim 15, the operations further comprising:
after executing the soft deletion of the first group chat conversation, receiving a second chat message initiation input from the client device; and
in response to receiving the second chat message initiation input, presenting, on the display of the client device, the plurality of suggested chat conversations in which the first group chat conversation is not included.

17. The non-transitory computer-readable medium of claim 15, wherein the chat feed of the user includes chat conversations in which the user is a participant, the chat conversations ordered in the chat feed based on time stamp values associated with each chat conversation.

18. The non-transitory computer-readable medium of claim 15, wherein the first group chat conversation has a group chat conversation name, the group chat conversation name having been designated by a participant of the first group chat conversation, the operations further comprising:
after executing the soft deletion of the first group chat conversation, receiving a search query including the group chat conversation name of the first group chat conversation;
accessing the first group chat conversation name based on the search query; and
presenting the first group chat conversation on a display of the client device in response to the search query.

19. The non-transitory computer-readable medium of claim 15, wherein the first group chat conversation does not have a group chat conversation name and the first group chat conversation becomes inaccessible via a search query after executing the soft deletion of the first group chat conversation.

20. The non-transitory computer-readable medium of claim 15, wherein the operations further comprising selectively enabling access to the first group chat conversation that has been soft deleted through a conversation search based on the first group chat conversation being assigned a group chat conversation name.

* * * * *